United States Patent
Cloran et al.

(10) Patent No.: US 7,173,185 B1
(45) Date of Patent: Feb. 6, 2007

(54) PANEL MOUNTING SYSTEM

(75) Inventors: Shawn D. Cloran, Wauwatosa, WI (US); Kenneth J. Lutze, Shorewood, WI (US); Mark S. Williams, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/236,013

(22) Filed: Sep. 27, 2005

(51) Int. Cl.
*H01H 9/02* (2006.01)

(52) U.S. Cl. .......................... 174/58; 174/480; 174/60; 174/63; 174/64; 248/343; 211/26

(58) Field of Classification Search .................. 174/58, 174/50, 60, 61, 63–64, 480–481; 220/3.2–3.3, 220/3.8–3.9; 248/906, 343; 439/535; 361/600, 361/608; 211/26
See application file for complete search history.

(56) References Cited

U.S. PATENT DOCUMENTS

| | | | |
|---|---|---|---|
| 5,228,584 A * | 7/1993 | Williams, Jr. ................. 220/3.8 |
| 5,280,865 A * | 1/1994 | Van Hout et al. ........... 248/27.1 |
| 5,316,254 A * | 5/1994 | McCartha .................... 248/343 |
| 5,484,076 A * | 1/1996 | Petrushka .................... 220/3.9 |
| 6,827,230 B1 * | 12/2004 | Tuniewicz et al. ........... 220/3.8 |
| 7,009,110 B1 * | 3/2006 | Gretz .......................... 174/58 |
| 7,038,132 B1 * | 5/2006 | Lowe et al. ................. 174/58 |
| 7,041,896 B2 * | 5/2006 | Okamoto .................... 174/135 |

OTHER PUBLICATIONS

Blue Series Installation and Operation Manual, Everett, WA.

* cited by examiner

*Primary Examiner*—Dhiru R. Patel
(74) *Attorney, Agent, or Firm*—Keith M. Baxter; Alexander M. Gerasimow

(57) ABSTRACT

A mounting assembly for fastening a device housing onto a panel includes a housing and a clamp. The panel defines a front surface, a rear surface, and an opening extending therethrough for receiving the housing. The housing includes at least one wall sized to extend through the opening. The wall defines a bearing surface. The clamp includes a beam member and a head member. The beam member extends from the wall at a first end. The beam member is biased to deflect outwardly with respect to the wall at an oblique angle. The head member extends from a second end of the beam member and includes a first cam surface for engaging the rear surface of the panel and a second cam surface for engaging the bearing surface of the housing.

28 Claims, 5 Drawing Sheets

PANEL MOUNTING SYSTEM

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to industrial control systems, and, in particular, to a method and apparatus for mounting a device onto a panel.

An automated manufacturing assembly typically includes a set of mechanical and electrical components and one or more panel mount devices that allow a factory worker or operator to monitor or control the automated assembly. The mechanical and electrical components are integrated together to perform an automated manufacturing process. The controller is linked to a sub-set of the components (e.g., sensors) for receiving information regarding progression of the process and to another sub-set of the components (e.g., motors, actuators, etc.) for controlling progression of the process. A human-machine interface (HMI) is typically linked to the controller to facilitate either altering the process parameters or monitoring the process. In particular, the interface generally includes an output terminal, such as a display, that provides data to the user that is relevant to the controlled process. Likewise, one or more input devices, such as a touch screen or keypad, are typically provided so that a user can transmit information over the network to, for instance, the controller or controlled device.

While many different types of communication systems have been developed for linking the controller to the assembly components and to the interface, one particularly useful type of linkage is a network communication system, the Ethernet being an example. In the case of the Ethernet, for instance, an interface generates messages earmarked for the controller and transmits those messages onto the network. The controller listens on the network for messages earmarked for the controller and uses those messages to perform specific functions. Similarly, the controller earmarks specific messages for the interface and transmits those messages to the interface via the network.

Panel mount devices with operator interfaces are typically mounted onto a panel having a front surface that faces the operator, and a rear surface that is generally inaccessible during normal operation. An opening is provided in the panel that receives the interface from the front. The interface is thus fastened to the panel at the rear panel surface. When mounting the interface, the rear of the panel is difficult to access and not visible by the installer or panel builder when stationed in front of the panel. In some instances, the rear panel surface can be accessed by the installer. However, accessing the rear panel surface in order to mount an interface can be tedious and time-consuming, especially when mounting a plurality of interfaces onto a panel.

Accordingly, conventional mounting assemblies enable an installer stationed in front of the panel to mount the interface on a blind rear panel surface. For instance, one typical mounting assembly includes a screw or other rotatable fastener that extends inwardly from the rear of the interface towards the rear surface of the panel that can be rotated until the fastener abuts the rear panel surface. Such fasteners must first be positioned in a threaded aperture, and are further ergonomically unfriendly to the installer. Furthermore, when the fastener is rotated by the installer, the fasteners will likely be blind to the installer who is stationed at the front of the panel. As a result, under-rotation can compromise the mounting stability, while over-rotation can place excessive stresses on the fastening parts which can wear and fail over time. Other mounting assemblies require multiple installers, positioned at the front and rear of the panel.

Additionally, many panel mount industrial controls are typically made using polymeric materials which may deform over time, especially at the elevated temperatures typical of an industrial environment. As a result, the mounting mechanism for the panel mount device must be robust to long term temperature variation and may also be required to protect the interior of the panel from ingress of various fluids common to industrial environments.

What is therefore needed is a method and apparatus that facilitates mounting an industrial control device onto a panel in a less tedious and more reliable manner than conventionally achieved. The apparatus should provide the mechanical stability necessary to withstand the industrial environment and should facilitate an environmental seal that can be certified to various standards commonly accepted in the industry.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

One aspect of the present invention is seen in a mounting assembly for fastening a device housing onto a panel including a housing and a clamp. The panel defines a front surface, a rear surface, and an opening extending therethrough for receiving the housing. The housing includes at least one wall sized to extend through the opening. The wall defines a bearing surface. The clamp includes a beam member and a head member. The beam member extends from the wall at a first end. The beam member is biased to deflect outwardly with respect to the wall at an oblique angle. The head member extends from a second end of the beam member and includes a first cam surface for engaging the rear surface of the panel and a second cam surface for engaging the bearing surface of the housing.

Another aspect of the present invention is seen in a method for fastening an industrial control device housing onto a panel. The panel defines a front surface, a rear surface, and an opening extending therethrough for receiving the housing. The method comprises providing a housing including at least one wall sized to extend through the opening and defining a bearing surface, and a clamp including a beam member extending from the wall at a first end. The beam member is biased to deflect outwardly with respect to the wall at an oblique angle. A head member extends from a second end of the beam member. The head member includes a first cam surface for engaging the rear surface of the panel and a second cam surface for engaging the bearing member. The housing is inserted through the opening thereby deflecting the beam member inwardly toward the side wall until a first position at which the first cam surface abuts the rear surface of the panel. The housing is further inserted through the opening to allow outward deflection of the beam member to engage the first cam surface with the rear surface of the panel and the second cam surface with the bearing member.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
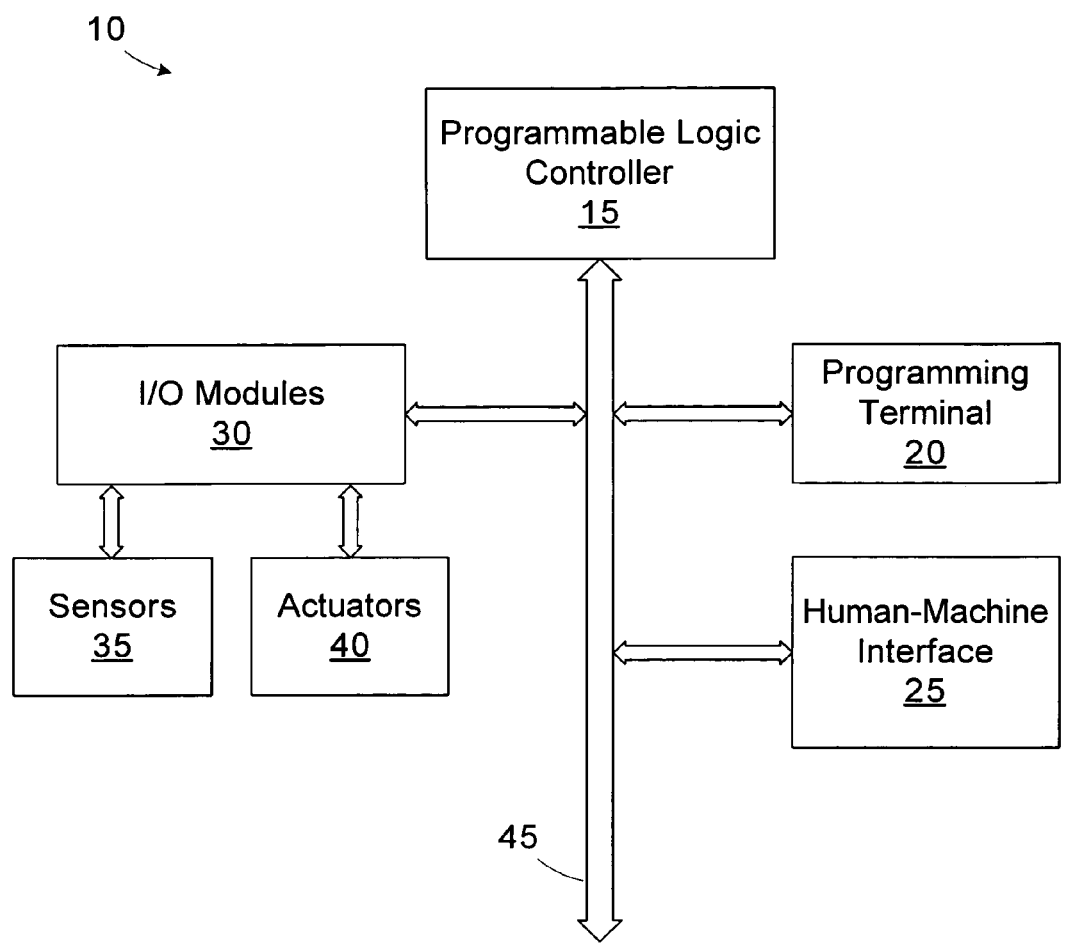
FIG. 1 is a simplified block diagram of an industrial control system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of an industrial control system 10 used for industrial automation. It should be appreciated that the industrial control system 10 is provided only as an example of one of a multitude of systems that can incorporate a human-machine interface (HMI), and that the present invention is not limited to the example described herein. Moreover, the panel mounting structures described herein are not limited to HMI applications. For example, other panel mounted equipment, such as sensors, displays, controls, etc. may also incorporate the panel mounting features described herein.

Generally, the industrial control system 10 includes a programmable logic controller (PLC) 15, a programming terminal 20, a human-machine interface (HMI) 25, an I/O module 30, sensors 35, actuators 40, and a communication medium 45. The programming terminal 20 allows the configuring, modifying, debugging and maintaining of the industrial control system 10. The HMI 25 provides an operator interface for operating the industrial control system 10 to perform an automated industrial process. The I/O module 30 provides an interface to the sensors 35 and actuators 40. The sensors 35 can sense items such as temperature, pressure, flow rate of a fluid, torque, electrical current, etc. The actuators 40 control items such as motors, switches, and valves associated with robotic systems, fans, beaters, pumps, and the like.

The communication medium 45 may take the form of a cable, and may also include repeaters, routers, bridges, and gateways. A suitable communication medium 45 is the ControlNet™ network offered by Rockwell Automation, Inc., of Milwaukee, Wis. ControlNet™ is a high-speed, deterministic, scheduled network for the transmission of time-critical application information.

Figure 2:
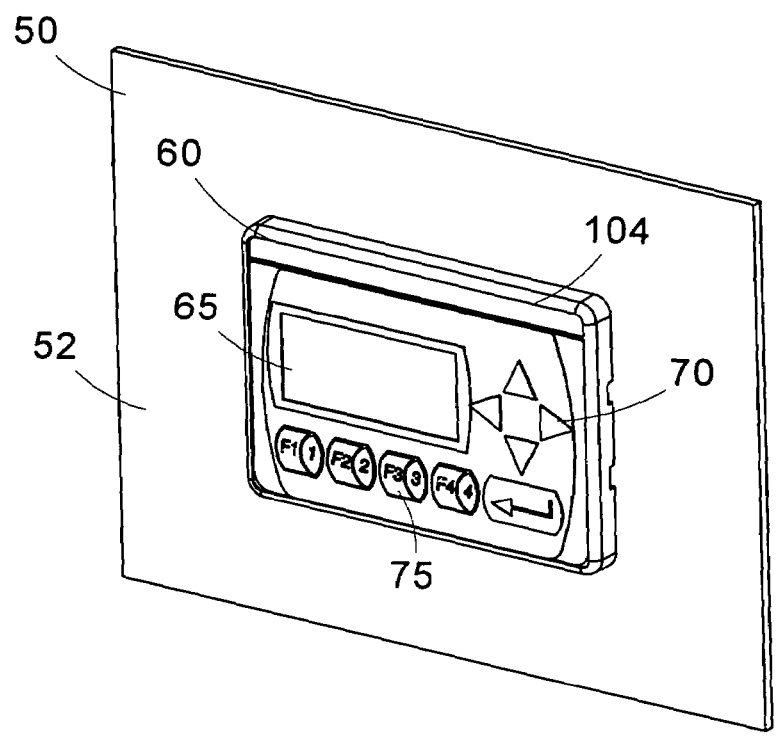
FIGS. 2, 3, and 4 are front isometric, rear isometric, and top views of a panel mount industrial control device with a human machine interface employed in the system of FIG. 1, respectively.
Figure 3:
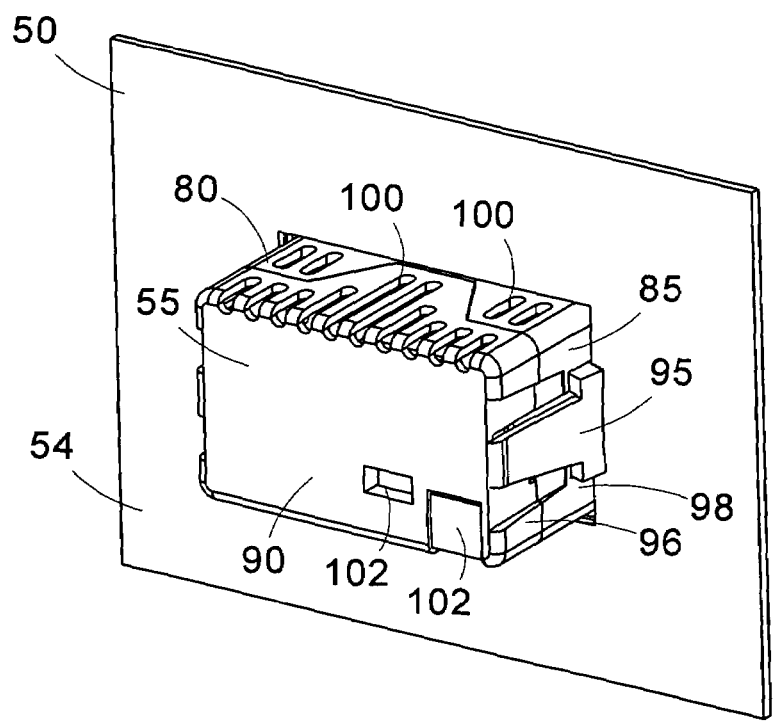
Figure 4:
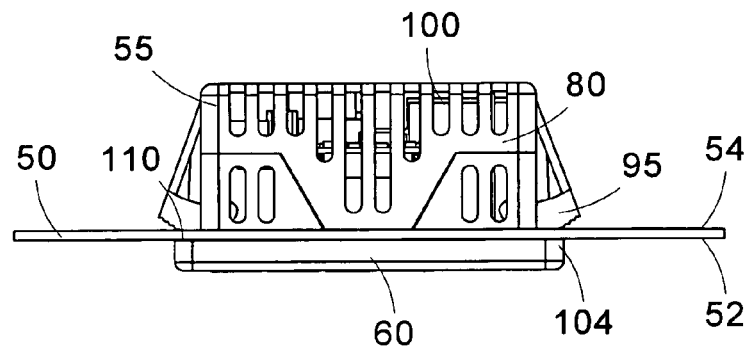

Referring now to FIGS. 2–4, an exemplary HMI 25 mounted to a panel 50 having front and rear surfaces 52, 54, respectively, is illustrated. The exemplary HMI 25 includes a housing 55 supporting the internal components of the HMI 25 (e.g., memory, processor, network interface, etc.) and a front bezel 60. The front bezel 60 supports a display 65, a navigation keypad 70, and a function keypad 75. Of course other arrangements and interface devices may be used. For example, alternative input interfaces (e.g., alphanumeric keypad, touch sensitive screen, trackball, stylus, etc.) or alternative output devices (e.g., speaker, indicator lights, meters, etc.) may be supported by the bezel 60. In the illustrated embodiment, the housing 55 and bezel 60 are formed of a plastic material, however, other materials, such as metal, may also be used.

The HMI 25 is installed by a panel builder or installer from the front of the panel 50 by inserting the housing 55 through an opening defined therein. The installer need not have access to the rear surface 54 of the panel 50 during installation, and only one individual is required to complete the installation.

The housing 55 includes side walls 80, end walls 85, a rear cover 90, and panel clamps 95 that engage the panel 50 to secure the HMI 25 thereto. One or more apertures 100 extend through the housing 55 to provide a plurality of vents that enable cooling air to travel across the HMI 25. Other apertures 102 of various shapes and sizes may be provided to allow power or data connections to be made with the HMI 25. The bezel 60 defines a rim 104 that extends beyond an outer periphery defined by the side walls 80 and end walls 85 of the housing 55. The number and arrangement of panel clamps 95 may vary depending on the particular application (e.g., based on the size of the HMI 25). In the illustrated embodiment, one panel clamp 95 is defined along each end wall 85. In other embodiments, multiple panel clamps 95 may be defined for each end wall 85 and/or additional panel clamps 95 may be defined along the side walls 80.

In the illustrated embodiment, the end walls 85 are defined by a first portion 96 extending from the rear cover 90 and a second portion 98 extending from the bezel 60. The application of the present invention is not limited to this two-part construction. For example, a unitary construction may be used where the housing is formed as a single part. Also, if a two-part construction is used, the positioning of the interface between the bezel 60 and the end cover 90 may vary. For instance, the entire end wall 85 may be defined by either the end cover 90 or the bezel 60. Hence, the end wall 85 is defined in the housing 55, regardless of whether the housing 55 is formed of one, two, or more interfacing parts.

Figure 5:
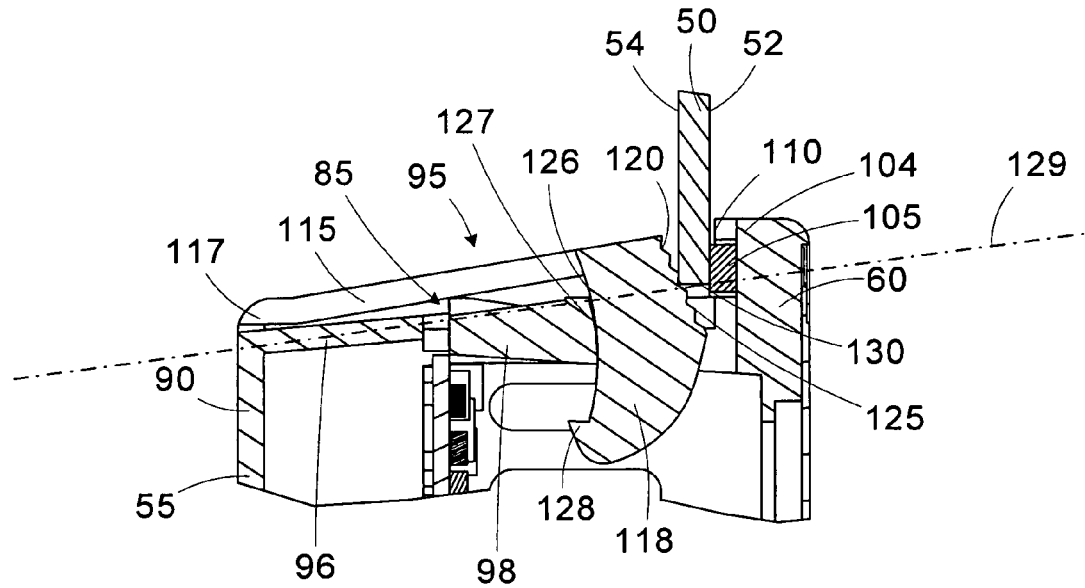
FIGS. 5 through 7 are partial cross-section views of a panel clamp on the HMI of FIG. 2 in various stages of engagement with the panel.

Referring to FIG. 5, a cutaway cross-section view of the HMI 25 engaged with the panel 50 is shown. A compressible gasket 105 is disposed on a rear surface 110 of the bezel 60 along the rim 104 to provide an environmental seal between the HMI 25 and the front surface 52 of the panel 50. When mounted, the gasket 105 provides a seal against the panel 50 that prevents the ingress of fluids or dust at the interface between the panel 50 and the housing 55, complying with the NEMA 4X standard for an environmental seal.

Figure 6:
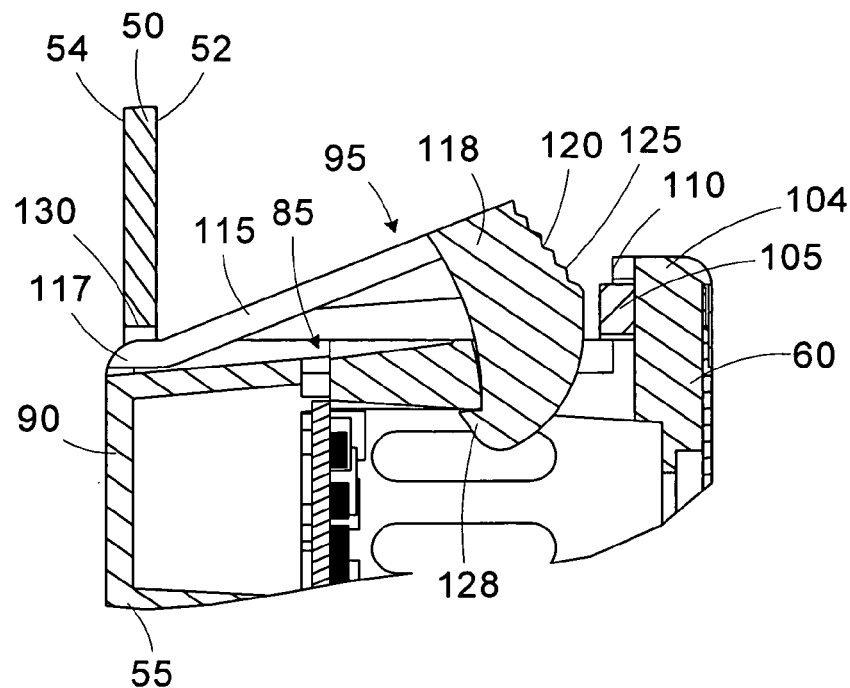
Figure 7:
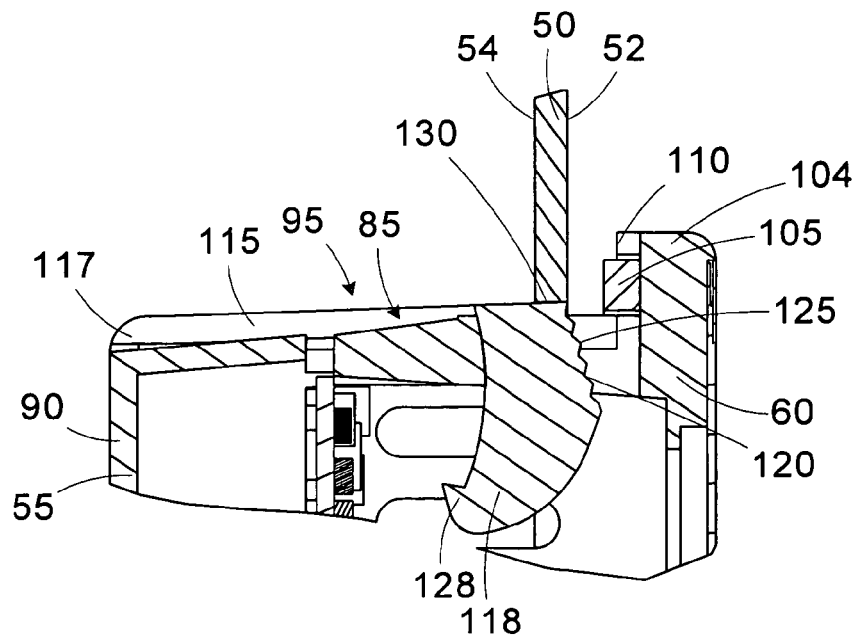
Figure 8:
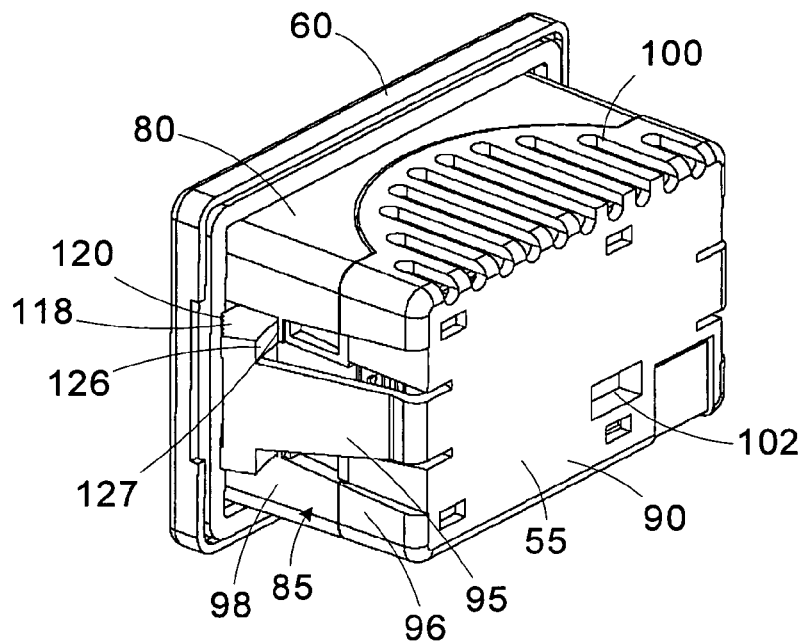
FIG. 8 is a rear isometric view of the industrial control device disengaged from the panel.

FIGS. 6 and 7 illustrate the panel clamp 95 in various stages of engagement with the panel 50, and FIG. 5 illustrates the panel clamp 95 in a fully engaged position. FIG. 8 illustrates the housing disengaged from the panel 50. The panel clamps 95 are spring loaded and self-actuating. In the illustrated embodiment, the spring nature of the panel clamps 95 results from them being formed from a cantilevered beam 115 extending from the housing 55 at one end 117. The cantilevered beam 115 extends outwardly with respect to the end walls 85 when in a non-deflected disengaged position, as illustrated in FIG. 6. The panel clamp 95 further includes a head 118 having a first arcuate cam surface 120 extending from a second end of the cantilevered beam 115 and having a plurality of teeth 125 defined along the cam surface 120. A second arcuate cam surface 126 is present on the head member 119 opposite the cam surface 120 that engages with a bearing surface 127 defined in the end wall 85 (i.e., either by bezel 60 or the end cover 90).

Of course, alternative arrangements may be provided for biasing the panel clamps 95 in an outwardly deflecting position. For example, a hinge formed at the intersection of the beam 115 and the housing 55 may allow rotation of the beam 115 and an associated leaf spring may be provided to outwardly bias the beam 115. A lip 128 may be provided on the head 118 for limiting the outward deflection of the beam 115. The lip 128 defined on the head 118 serves as a stop surface that engages the end wall 85 to prevent further outward rotation of the panel clamp 95 that may damage the beam 115 by deforming it such that is loses its spring nature.

The cam surface 126 and bearing surface 127 engage such that the interference between the cam surface 126 and the bearing surface 127 increases as the panel clamp 95 is deflected inwardly. This interference provides an additional deflection resisting force that further urges the head 118 of the panel clamp 95 to its undeflected position.

Referring to FIG. 6, as the housing 55 is inserted through an opening in the panel 50, the edge 130 of the panel 50 deflects the cantilevered beam 115 inwardly. This inward deflection increases until the cantilevered beam 115 is nearly parallel with the end wall 85 (i.e., assuming the size of the opening in the panel 50 corresponds to the size of the housing 55), as shown in FIG. 7.

Returning to FIG. 5, as the housing 55 is inserted further than the length of the cantilevered beam 115, the cam surface 120 engages the rear surface 54 of the panel 50 as the beam 115 and head 118 return toward their undeflected positions. The spring nature of the cantilevered beam 115 and the interference between the cam surface 126 and the bearing surface 127 aid in this return. As the housing 55 is inserted further into the opening, subsequent teeth 125 engage the panel 50, and the beam 115 continues to spring outwardly. The particular tooth 125 that engages the rear surface 54 when the housing 55 is fully inserted depends on the height of the teeth 125, the thickness of the panel 50, and the compressibility of the gasket 105. Although the teeth 125 are shown as having uniform height displacements between adjacent teeth 125, it is contemplated that the height displacements may vary along the length of the cam surface 120. For example, the height displacement may decrease for the teeth 125 disposed furthest from the beam 115 to allow finer step adjustments in the region of the cam surface 120 likely to be in contact with the panel 50 when the gasket 105 is in a compressed state.

When the gasket 105 engages the front surface 52 of the panel 50, and the installer continues to exert an insertion force, the gasket 105 will compress, thereby allowing further outward rotation of the head 118 of the panel clamp 95 and the engagement of another tooth 125 along the cam surface 120. Assuming the compressibility of the gasket 105 is greater than or equal to the height of one tooth 125, at least one additional tooth 125 will be engaged when the installer inserts the housing 55 and compresses the gasket 105 until the rear surface 110 of the bezel 60 touches or nearly touches the front surface 52 of the panel 50. Hence, when the insertion force is removed, the gasket 105 will remain in compression, thereby providing an environmental seal. As seen by comparing FIGS. 5 and 6, the gasket 105 is in compression when the housing 55 is fully inserted.

The force generated by the compressed gasket 105 further urges the cam surface 126 on the head 118 to engage the bearing surface 127, thereby creating a load path 129 that extends through the end wall 85 which defines the bearing surface 127, head 118, panel 50, gasket 105, and bezel 60. The load between the head 118 and the panel 50, which keeps the integrity of the environmental seal created by the gasket 105, is transferred along the load path 129, thereby removing the load from the beam member 115. Without the interaction between the cam surface 126 and the bearing surface 127 to create the load path 129, the load would be borne entirely by the beam member 115. This loading, over time and temperature variation, could cause a weakening or deformation of the beam member 115, thereby compromising the integrity of the environmental seal.

Hence, the HMI 25 may be easily installed by a single individual present at the front of the panel 50 without requiring access to the rear surface 54. The installer simply inserts the housing 55 and continue to provide an insertion force until the bezel 60 touches the front surface 52 of the panel 50 or the gasket 105 is fully compressed. The heads 118 of the spring clamps 95 will rotate outwardly as the teeth 125 of the cam surface 120 engage the panel 50. When the insertion force is removed, the HMI 25 is secured to the panel 50 with the sealing gasket 105 in compression. The installation of the HMI 25 may be performed in seconds, as compared to the previous mounting techniques which took considerably longer and sometimes required multiple individuals.

Figure 9:
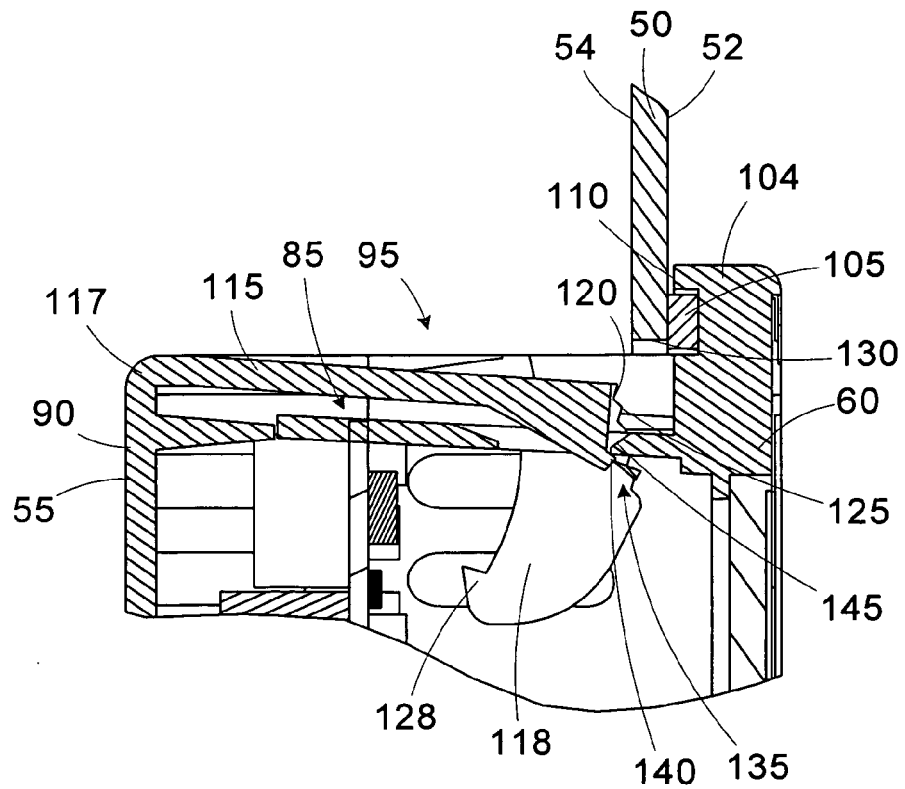
FIG. 9 is a partial cross-section view of alternative embodiment of the panel clamp including a latch for disengaging the panel clamp to allow removal of the HMI from the panel.

Turning now to FIG. 9, an alternative embodiment of the panel clamp 95 that includes a depanelization latch 135 is provided. The latch 135 facilitates removal of the HMI 25 from the panel 50. As described above and shown in FIG. 7, the maximum inward deflection of the beam 115 of the panel clamp 95 during insertion of the housing 55 is such that the beam 115 is parallel to the end wall 85. The beam 115 would be parallel if the opening in the panel 50 exactly matched the dimensions of the housing 55. If the panel opening were to be larger than the dimensions of the housing 55, the deflection would be less than parallel.

As seen in FIG. 9, a first tab 140 is defined on the head 118 of the panel clamp 95 and a second tab 145 is defined on the housing 55 (e.g., extending from the bezel 60 or defined in the end wall 85). Removal of the HMI 25 requires access to the rear surface 54 of the panel 50 to allow the disengaging of the panel clamps 95. An installer deflects the panel clamp 95 inwardly past the parallel position such that the tab 140 on the panel clamp 95 engages the tab 145 on the housing 55 and retains the panel clamp 95 in a disengaged position. When all of the panel clamps 95 have been disengaged, the HMI 25 may be extracted from the front of the panel. Hence, only one individual is required for removing the HMI 25 from the panel 50.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A mounting assembly for fastening a device housing onto a panel defining a front surface, a rear surface, and an opening extending therethrough for receiving the housing, the mounting assembly comprising:
   a housing including at least one wall sized to extend through the opening, the wall defining a bearing surface;
   a clamp including:
      a beam member extending from the wall at a first end, the beam member being biased to deflect outwardly with respect to the wall at an oblique angle;
      a head member extending from a second end of the beam member proximate the bearing surface, the head member including a first cam surface for engaging the rear surface of the panel and a second cam surface for engaging the bearing surface of the housing.

2. The assembly of claim 1, wherein the first and second cam surfaces comprise arcuate surfaces.

3. The assembly of claim 1, wherein the first cam surface defines a plurality of teeth providing engagement surfaces.

4. The assembly of claim 3, wherein the engagement surfaces are displaced from one another along the first cam surface to account for thickness variations of the panel.

5. The assembly of claim 3, wherein the engagement surfaces comprise teeth defined in the first cam surface.

6. The assembly of claim 1, wherein the second cam surface is configured to engage the bearing surface to create an interfering fit therebetween.

7. The assembly of claim 6, wherein the degree of interference increases as the clamp is deflected inwardly with respect to the wall.

8. The assembly of claim 1, wherein the housing further comprises:
   a rim extending from the wall and having a rear surface; and
   a gasket disposed on the rear surface for engaging the front surface of the panel and creating a seal between the front and rear surfaces of the panel about the opening.

9. The assembly of claim 8, wherein the housing comprises:
   side walls and end walls defining an enclosure, the clamp being disposed along one of the side and end walls; and
   a bezel covering one end of the enclosure, the bezel extending outside the enclosure to define the rim.

10. The assembly of claim 8, further comprising a plurality of clamps disposed along ones of the side and end walls.

11. The assembly of claim 8, wherein the first cam surface defines a plurality of teeth, a height offset being defined between adjacent teeth, and the gasket is compressible by an amount at least as great as the height offset.

12. The assembly of claim 1, further comprising a lip defined in the head member for engaging the wall to limit outward rotation of the beam with respect to the wall.

13. The assembly of claim 1, wherein the head member defines a first tab, and the housing defines a second tab, the first tab engaging the second tab when the beam is deflected inwardly to a position defining an said oblique angle with respect to the wall to retain the clamp in a disengaged position.

14. The assembly of claim 1, wherein the beam comprises a cantilevered beam.

15. The mounting assembly as recited in claim 1, wherein the device is an industrial control device.

16. The mounting assembly as recited in claim 1, wherein the device is a human-machine interface.

17. A method for fastening an industrial control device housing onto a panel defining a front surface, a rear surface, and an opening extending therethrough for receiving the housing, the method comprising:
   providing a housing including at least one wall sized to extend through the opening and defining a bearing surface, and a clamp including a beam member extending from the wall at a first end, the beam member being biased to deflect outwardly with respect to the wall at an oblique angle and a head member extending from a second end of the beam member, the head member including a first cam surface for engaging the rear surface of the panel and a second cam surface for engaging the bearing member;
   inserting the housing through the opening thereby deflecting the beam member inwardly toward the wall until a first position at which the first cam surface abuts the rear surface of the panel; and
   further inserting the housing through the opening to allow outward deflection of the beam member to engage the first cam surface with the rear surface of the panel and the second cam surface with the bearing member.

18. The method of claim 17, wherein the second cam surface is configured to engage the bearing surface to create an interfering fit therebetween.

19. The method of claim 18, wherein the degree of interference increases as the clamp is deflected inwardly with respect to the wall.

20. The method of claim 17, wherein the first cam surface defines a plurality of teeth providing engagement surfaces, and further inserting the housing comprises inserting the housing through the opening until one of the engagement surfaces engages the rear surface of the panel.

21. The method of claim 20, wherein providing the housing further comprises providing the engagement surfaces displaced from one another along the first cam surface to account for thickness variations of the panel.

22. The method of claim 17, wherein providing the housing further comprises:
   providing a rim extending from the wall and having a rear surface; and
   providing a gasket disposed on the rear surface for engaging the front surface of the panel.

23. The method of claim 22, wherein further inserting the housing comprises further inserting the housing until the gasket is in a compressed state, the first cam surface engaging the rear surface of the panel and the second cam surface engaging the bearing surface to retain the gasket in the compressed state to create a seal between the front and rear surfaces of the panel about the opening.

24. The method of claim 23, wherein providing the housing further comprises providing side walls and end walls defining an enclosure, the clamp being disposed along one of the side and end walls and providing a bezel covering one end of the enclosure, the bezel extending outside the enclosure to define the rim, and further inserting the housing comprises inserting the housing into the opening until the bezel contacts the front surface of the panel.

25. The method of claim 23, wherein the first cam surface defines a plurality of engagement surfaces, a height offset is defined between adjacent teeth, and further inserting the housing comprises further inserting the housing to compress the gasket by an amount at least as great as the height offset.

26. The method of claim 22, wherein providing the housing further comprises:
   providing side walls and end walls defining an enclosure, the clamp being disposed along one of the side and end walls; and
   providing a bezel covering one end of the enclosure, the bezel extending outside the enclosure to define the rim.

27. The method of claim 26, further comprising inserting the housing into the opening until the bezel contacts the front surface of the panel.

28. The method of claim 17, wherein the head member defines a first tab, and the housing defines a second tab, and the method further comprises:
   deflecting the beam member inwardly to a position defining an said oblique angle with respect to the wall to engage the first and second tabs to retain the clamp in a disengaged position; and
   removing the housing from the opening.

* * * * *